Aug. 30, 1966 R. C. BLAKESLEY 3,268,981
INSERTED BLADE FACE MILL CUTTER
Filed Aug. 20, 1965

*INVENTOR.*
RICHARD C. BLAKESLEY
BY
*Richard W. Treverton*
ATTORNEY

United States Patent Office 3,268,981
Patented August 30, 1966

3,268,981
INSERTED BLADE FACE MILL CUTTER
Richard C. Blakesley, Holcomb, N.Y., assignor to The Gleason Works, Rochester, N.Y., a corporation of New York
Filed Aug. 20, 1965, Ser. No. 481,349
9 Claims. (Cl. 29—105)

The present invention relates to an inserted blade face mill cutter for gears and the like, especially for spiral bevel and hypoid gears, and is an improvement on the cutter disclosed in application Serial No. 404,421, filed by myself and Lawrence J. Smith on October 16, 1964.

In that cutter the blades are held in radial slots in the cutter head by compression screws which clamp the blades against shims and/or adjusting wedges in the bottoms of the slots. The screws are threaded through bridge pieces which extend across the slots, outwardly of the blades, and engage in lateral recesses in the side walls of the slots. The load bearing surfaces of these lateral recesses are perpendicular to the side walls of the radial slots, so that the reaction from tightening of the screws is applied to the inter-slot lands of the cutter head approximately radially. Cutters constructed in this manner have been found to have several advantages, as described in the aforementioned patent application, including relative ease of truing which arises in part from the fact that the loosening or tightening of one screw produces very little disturbance of blades in adjacent slots.

The object of the present invention is a further decrease in such disturbance, to thereby further facilitate the truing of cutters which, owing to their having a large number of blades, have relatively thin inter-slot lands and yet must be true within a very close tolerance in order to produce gears of high quality.

A face mill cutter according to the present invention comprises a head of generally circular form and having around its periphery substantially radial slots whose opposite sides have lateral recesses, bridge pieces extending across the slots and bearing on the outer surfaces of said recesses, cutter blades confined in the slots between the sides thereof and inwardly of the bridge pieces, and compression screws threaded to the bridge pieces for clamping the blades in the slots, the cutter head having slits around the periphery thereof extending radially into the lands between adjacent slots.

It has been found that these slits, which separate the two bridge-contacting portions of each inter-slot land, substantially reduce the displacement of the cutting edge of a clamped blade when the holding screw of an adjacent blade is tightened or loosened, and to this extent facilitates accurate cutter truing. Presumably the slits act to decrease the transmission, to one side of a land, of strains or minute deflections which by such tightening or loosening are produced or released in or adjacent to the bridge contacting portion on the opposite side of the land.

A preferred embodiment of the invention is shown in the accompanying drawings, wherein.

Figure 1:
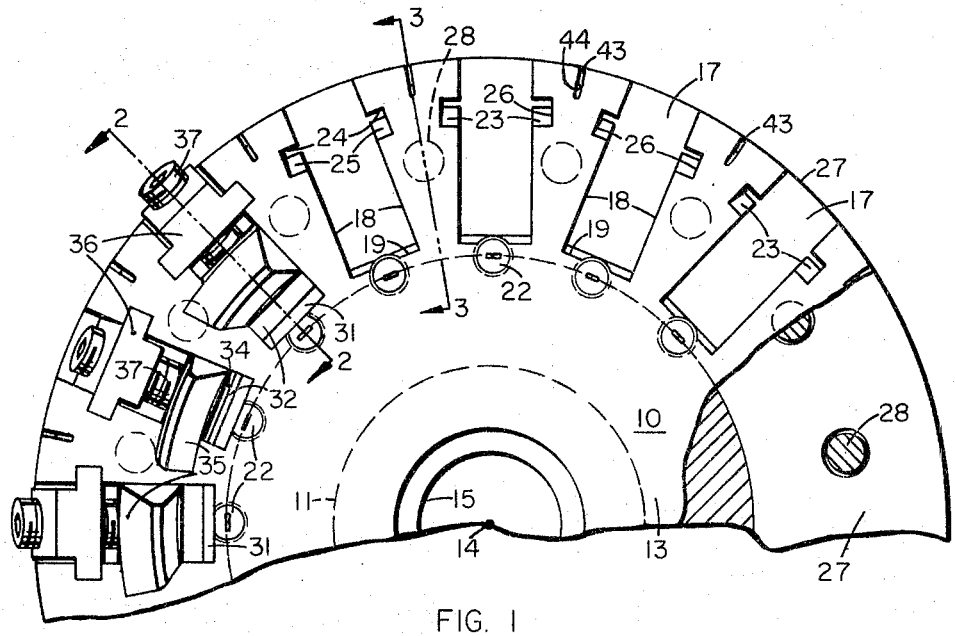
FIG. 1 is a front view of the cutter, with parts broken away.

The cutter comprises a cutter head 10 of generally circular form having a central bore 11 extending from its rear face 12 for receiving the nose of the cutter spindle, not shown, of a gear cutting machine. Extending from the front face 13 of the head, and coaxial of bore 11, on axis 14, is a smaller bore 15 for passing the shank of a screw, also not shown, for detachably securing the head to the cutter spindle.

Spaced around the periphery of head 10 are a plurality of radially extending blade-receiving slots 17 having parallel side walls 18 disposed in planes that are equally spaced from and parallel to axis 14, and a plane bottom wall 19 perpendicular to side walls 18 and inclined at a small acute angle to axis 14. Opening into the center of each bottom wall is a screw-threaded bore 21, parallel to axis 14, for a wedge adjusting screw 22. A segment of each screw projects into the adjacent slot 17. Lateral recesses 23 extend from the opposite sides of each slot 17, each such recess having parallel plane outer and inner walls, 24 and 25, respectively, perpendicular to side walls 18 and inclined at a small acute angle (10°) to axis 14. Each recess 23 also has a plane bottom wall 26 parallel to side walls 18. The back peripheral portion of the head 10 has therearound an annular groove receiving a ring 27 whose axis is 14. This ring is substantially rectangular in axial section and is rigidly secured to the head by screws 28, there being one such screw threaded into each land between slots 17. The plane front face 29 of the ring constitutes the back wall of each slot 17.

Disposed in each slot 17 there is a wedge 31, a shim or parallel 32, the orthogonal shank 34 of a cutter blade whose cutting portion 35 projects from the front of the head 10, and a substantially T-shaped bridge piece 36 through which is threaded a set screw 37. The wedge, parallel and blade shank have plane parallel side walls adapted for sliding surface contact with slot side walls 18. The inner and outer plane faces 38 and 39 of the wedge are inclined to each other at the same angle that slot bottom wall 19 is inclined to the cutter axis, so that the outer face of the wedge, and parallel 32, upon which the blade shank seats, are parallel to that axis. The outer face 41 of the blade shank 34 engageable by the inner end of set screw 37 is parallel to outer recess walls 24 which are in contact with the flanges of the T-shaped bridge piece. Because of the angle (10°) between face 41 and the outer face of the parallel 32, the set screw when tightened not only clamps the blade shank tightly against the parallel but also presses the shank rearwardly, clamping its plane back face 42 to back wall 29 of the slot. As shown, the set screw is substantially central of the bridge piece and perpendicular to the plane of recess outer walls 24. The flanges of the bridge piece preferably have an easy fit with recess surfaces 24 and 25 (when screw 37 is loosened) and also with recess bottom surfaces 26.

Figure 2:
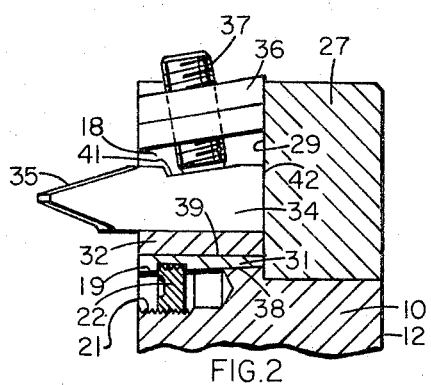
FIG. 2 is a fragmentary section approximately in the radial planes designated 2—2 and 3—3 in FIG. 1.

Each wedge has a recess in its inner face 38 for receiving the segment of adjusting screw 22 that projects outwardly (upwardly in FIG. 2) from slot bottom wall 19. With this arrangement fine radial adjustments of the blade 34 can be made by loosening set screw 37 and turning the screw 22 to thereby move the wedge along bottom wall 19 of the slot. Coarse radial blade adjustments are made by substituting thicker or thinner parallels 32. To accommodate large radial adjustments of the blade, the bridge pieces may be inverted. To illustrate, in FIG. 1 the bridge piece in one of the slots has its narrow end innermost, while in two other slots, where the parallel 32 are much thicker, the bridge pieces are relatively inverted, so that their narrow ends are outermost.

For the purpose of reducing minute displacements of the cutting edges of a blade when the holding screw 37 of an adjacent blade is loosened or tightened, the head has slits 43 formed around the periphery thereof.

Figure 3:
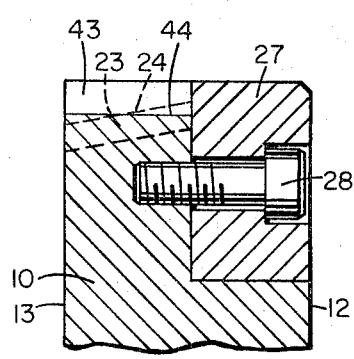
Figure 4:
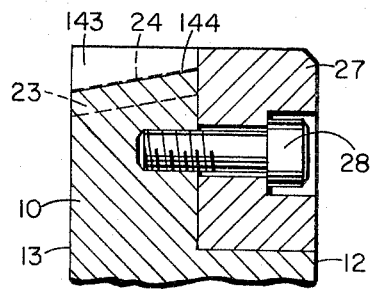
FIG. 4 is a section similar to FIG. 3 through a modified cutter.

These slits extend substantially radially of the head and are preferably as thin as possible. Each slit 43 is formed in the center of a land between adjacent blade-receiving slots 17. As shown in FIG. 3, the bottoms 44 of the slits are substantially perpendicular to the faces 12 and 13, i.e., are parallel to the cutter axis 14 and are at approximately the same distance, on average, from the cutter axis as the outer surfaces 24 of the recesses 23, being at a somewhat larger radial distance than the surfaces 24 adjacent the front face 13 and at a smaller radial distance adjacent rear face 12. The modified cutter shown in FIG. 4 differs from that shown in FIGS. 1 to 3 in that the slits, designated 143, taper in radial extent, their bottoms 144 inclining relative to the cutter axis in substantially the same direction as the adjacent lateral recesses 23. They also are at approximately the same distance from the cutter axis as the surfaces 24 of recesses 23.

Having now described the preferred embodiment of my invention, what I claim is:

1. A face mill cutter comprising a head of generally circular form and having around its periphery substantially radial slots whose opposite sides have lateral recesses, bridge pieces extending across the slots and bearing on the outer surfaces of said recesses, cutter blades confined in the slots between the sides thereof and inwardly of the bridge pieces, and compression screws threaded to the bridge pieces for clamping the blades in the slots, the cutter head having slits around the periphery thereof extending radially into the lands between adjacent slots.

2. A cutter according to claim 1 in which the bottoms of the slits are at approximately the same distance from the cutter axis as said outer surfaces of the lateral recesses.

3. A cutter according to claim 1 in which the surfaces of the blades engaged by the screws are inclined to the cutter axis to cause the blades to be drawn axially as well as radially inward when the screws are tightened and the outer surfaces of the lateral recesses are similarly inclined relative to the cutter axis.

4. A cutter according to claim 3 in which the bottoms of the slits are at approximately the same distance from the cutter axis as said outer surfaces of the lateral recesses.

5. A cutter according to claim 4 in which the bottoms of the slits are substantially parallel to the cutter axis.

6. A cutter according to claim 4 in which the bottoms of the slits are inclined to the cutter axis at approximately the same angle as said lateral recesses.

7. A cutter according to claim 1 in which the opposite sides of the slots which confine the blades are parallel, and the bridge pieces and lateral recesses have bearing contact in planes which are at least approximately perpendicular to said parallel sides.

8. A cutter according to claim 7 in which the bottom of the slits are at approximately the same distance from the cutter axis as said outer surfaces of the lateral recesses.

9. A cutter according to claim 7 in which the surfaces of the blades engaged by the screws are inclined to the cutter axis to cause the blades to be drawn axially as well as radially inward when the screws are tightened, the outer surfaces of the lateral recesses are similarly inclined, and the bottoms of the slits are at approximately the same average distance from the cutter axis as said outer surfaces of the lateral recesses, being at a greater distance than said outer surfaces adjacent the front of the cutter and at a smaller distance than said outer surfaces adjacent the rear of the cutter.

No references cited.

WILLIAM W. DYER, JR., *Primary Examiner.*

HARRISON HINSON, *Assistant Examiner.*